(12) United States Patent
Dunne et al.

(10) Patent No.: US 7,947,575 B2
(45) Date of Patent: May 24, 2011

(54) LASER MACHINING

(75) Inventors: Kali Dunne, Boyle (IE); Callian Cillian O'Briain Fallon, Malahide (IE)

(73) Assignee: Electro Scientific Industries, Inc., Portland, OR (US)

( * ) Notice: Subject to any disclaimer, the term of this patent is extended or adjusted under 35 U.S.C. 154(b) by 13 days.

(21) Appl. No.: 12/515,926

(22) PCT Filed: Nov. 27, 2007

(86) PCT No.: PCT/EP2007/010291
§ 371 (c)(1),
(2), (4) Date: Dec. 18, 2009

(87) PCT Pub. No.: WO2008/064863
PCT Pub. Date: Jun. 5, 2008

(65) Prior Publication Data
US 2010/0099239 A1 Apr. 22, 2010

(30) Foreign Application Priority Data

Nov. 27, 2006 (GB) .................................. 0623642.6

(51) Int. Cl.
*H01L 21/00* (2006.01)
(52) U.S. Cl. .................. 438/463; 257/E21.238; 216/94; 219/121.69
(58) Field of Classification Search .................. 438/463, 438/940; 257/E21.238; 216/64, 65; 219/121.69
See application file for complete search history.

(56) References Cited

U.S. PATENT DOCUMENTS

| 6,023,040 | A | 2/2000 | Zahavi et al. |
| 7,528,342 | B2 * | 5/2009 | Deshi ........................ 219/121.68 |
| 7,776,720 | B2 * | 8/2010 | Boyle et al. .................... 438/463 |
| 7,804,043 | B2 * | 9/2010 | Deshi ........................ 219/121.67 |
| 2005/0274702 | A1 | 12/2005 | Deshi |
| 2006/0039419 | A1 * | 2/2006 | Deshi ................................. 372/9 |
| 2006/0169677 | A1 * | 8/2006 | Deshi .......................... 219/121.7 |
| 2009/0194516 | A1 * | 8/2009 | Deshi ......................... 219/121.71 |
| 2010/0099239 | A1 * | 4/2010 | Dunne et al. ................... 438/463 |
| 2010/0197116 | A1 * | 8/2010 | Shah et al. .................... 438/463 |

FOREIGN PATENT DOCUMENTS

| WO | 99/34742 A1 | 7/1999 |
| WO | 00/10037 A2 | 2/2000 |
| WO | 02/34455 A1 | 5/2002 |

* cited by examiner

*Primary Examiner* — David Vu
*Assistant Examiner* — Earl N Taylor
(74) *Attorney, Agent, or Firm* — Young Basile

(57) ABSTRACT

A method of laser machining a feature in a substrate includes machining the substrate with a pulsed laser along a scan line so that the successive pulses 81 at the substrate do not overlap but are either contiguous or spaced apart. Pulses 82, 83, 84 in respective succeeding scans of the laser along the scan line, are offset with respect to the starting point of pulses 81, 82, 83 in a previous scan so that multiple successive laser scans provide machining to a required depth while successively smoothing edges, 91, 92, 93, 94 of the feature with each pass.

6 Claims, 3 Drawing Sheets

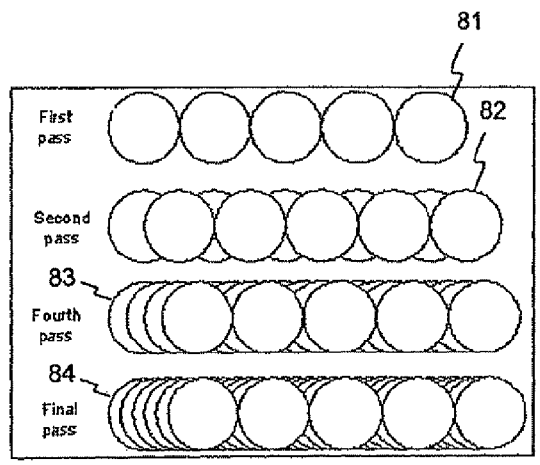
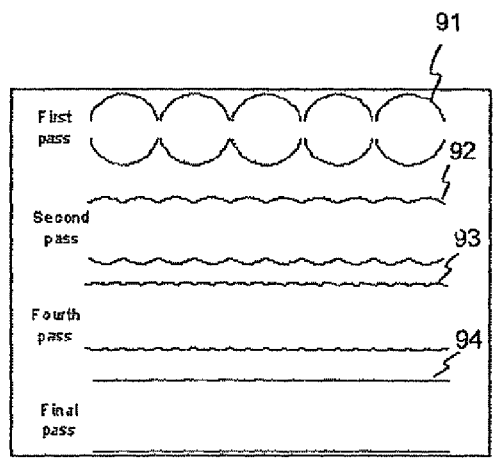
Figure 8               Figure 9
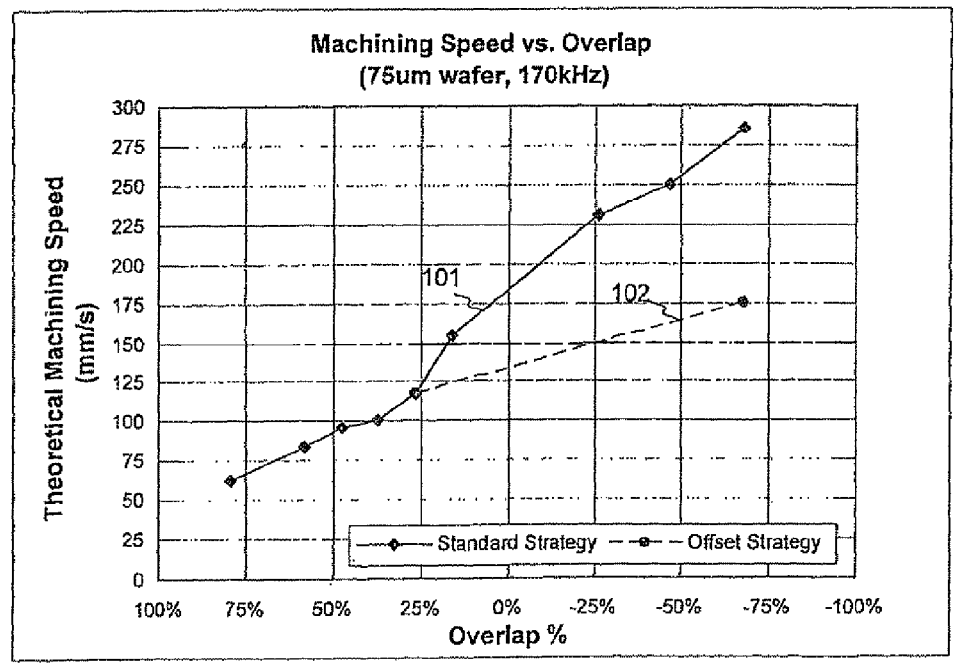
Figure 10

LASER MACHINING

CROSS-REFERENCE TO RELATED APPLICATIONS

This application is derived from PCT application PCT/EP2007/010291 filed Nov. 28, 2007 and claims priority from GB 0623642.6 filed Nov. 27, 2006.

FIELD OF THE INVENTION

This invention relates to laser machining and in particular to pulsed laser machining in which successive pulses do not overlap at the substrate being machined.

BACKGROUND OF THE INVENTION

Laser micro-machining with state of the art solid state lasers typically involves the use of lasers with galvanometer scanners to position a focussed laser beam on the surface of a wafer or substrate to be machined. Typically, these lasers operate at repetition rates of 30 to 200 kHz and scanning occurs at velocities such that individual focussed laser spots overlap to some extent to form a shallow trench or scribe line. As shown in FIG. 1, multiple lines or passes 11 are used in this way to cut through or to dice, i.e. singulate, semiconductor devices 12. This process is described in, for example, EP 1328372.

Thus laser dicing is accomplished by scanning a laser beam across a substrate. Typically, with laser dicing, as shown in FIG. 2, successive adjacent pulses 21 are placed to have a certain overlap by scanning the laser beam at a particular scan speed to give a substantial overlap between the pulses. The scan is repeated in a number of passes 11, until the substrate is fully diced through. As shown in FIG. 3, this results in dicing with a relatively smooth edge 31. As shown in FIGS. 4 and 5, if the overlap of pulses 41 is reduced the die can appear to have a 'scalloped' edge 51.

Moreover, as shown in FIG. 6, when a laser pulse 61 ablates material 62 a plume of debris 63 is created. If the subsequent pulse 64 interacts with the debris plume 63, the succeeding laser pulse 64 is partially attenuated because the debris plume partially absorbs the energy of the succeeding laser pulse.

SUMMARY OF THE INVENTION

According to the invention there is provided a method of laser machining a feature in a substrate comprising: machining the substrate with a pulsed laser along a scan line with a first scan such that a centre to centre spatial distance at the substrate between successive pulses in the laser pulse train is equal to at least a sum of radii of the successive pulses so that the successive pulses at the substrate do not overlap but are either contiguous or spaced apart; and machining with succeeding scans of the laser along the scan line which are offset along the scan line with respect to the starting point of a previous scan so that multiple successive laser scans provide machining to a required depth while smoothing edges of the feature.

Advantageously, successive pulses are sufficiently separated on the substrate that a plume produced by a laser pulse does not substantially absorb energy from a succeeding pulse.

Conveniently, the method comprises machining with a pulse repetition rate of 200 kHz to 300 kHz.

Advantageously, the method comprises complete dicing or slot cutting through the substrate.

Advantageously, the machining comprises a laser dicing process for semiconductor dicing.

Alternatively, the machining comprises slot drilling

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which:

FIG. 8 is a schematic plan view of successive offset scans of pulses on a substrate according to the invention using the substantially non-overlapping pulses of FIG. 7;

FIG. 9 is a schematic successive plan views of edges of a machined channel using the successive offset scans of FIG. 8; and FIG. 10 is a graph of theoretical machining speed versus pulse overlap with and without successive scans being offset as they are offset in FIG. 8.

DETAILED DESCRIPTION OF PREFERRED EMBODIMENTS

Figure 1:
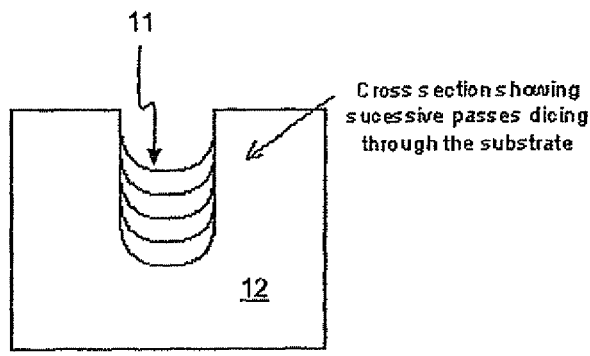
FIG. 1 is a schematic transverse cross-sectional view showing successive laser scans across a substrate to form a channel.
Figure 2:
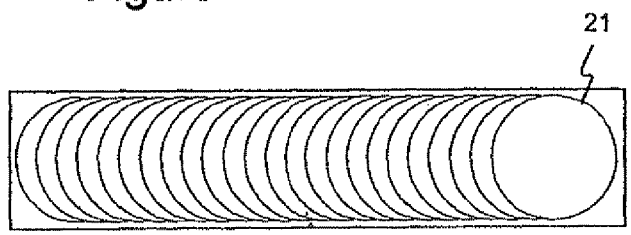
FIG. 2 is a schematic plan view of laser pulses on a substrate according to the prior art in which a succeeding laser pulse substantially overlaps a preceding pulse.
Figure 3:
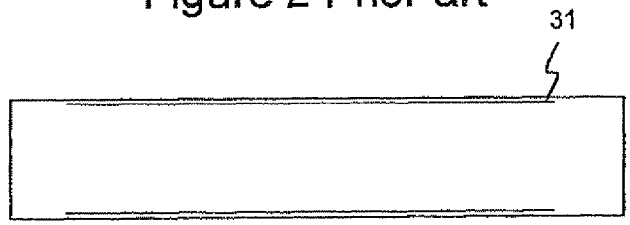
FIG. 3 is a schematic plan view of edges of a machined channel using the laser pulse pattern of FIG. 2.
Figure 4:
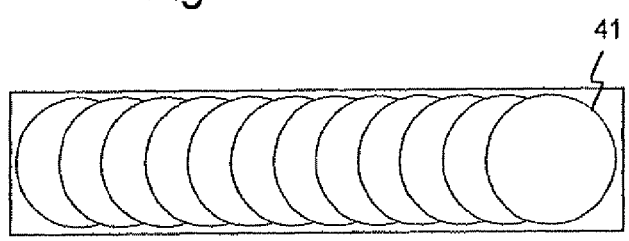
FIG. 4 is a schematic plan view of pulses on a substrate in which a succeeding laser pulse overlaps a preceding pulse less than in the pulse pattern of FIG. 2.
Figure 5:
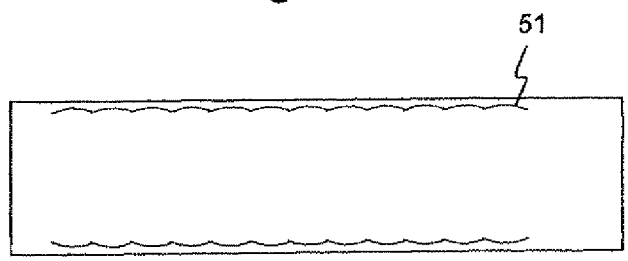
FIG. 5 is a schematic plan view of edges of a machined channel using the laser pulse pattern of FIG. 4.
Figure 6:
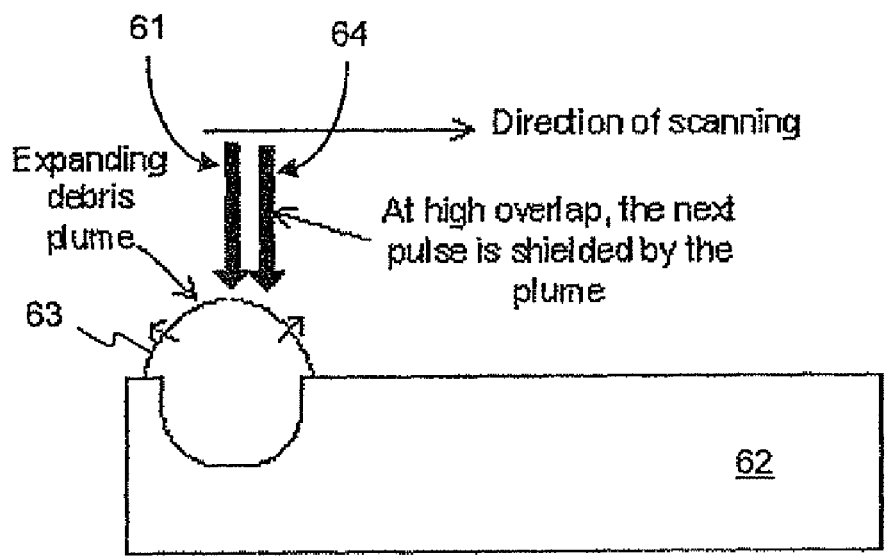
FIG. 6 is a transverse cross-sectional view of laser machining of a substrate using substantially overlapping laser pulses as in FIGS. 2 and 3.

Throughout the description, identical reference numerals are used to identify like parts.

The following definitions are used herein:

Repetition rate, R: The number of pulses per second emitted from the laser.

Scan Speed, Vg: The scanning velocity of the galvo.

Linear Overlap, O: The extent of overlap in microns between centres of consecutive pulses at the substrate.

Kerf diameter, K: Diameter of a specific trench or feature as formed by the laser pulses.

Pulse spacing, S: The centre-to-centre distance between sequential pulses of a single scan at the substrate.

Offset dither, D: The centre-to-centre distance between corresponding pulses formed by sequential scans in a multiple pass cutting process.

Number of Scans, N: The number of consecutive scans required to dice through a substrate.

Figure 7:
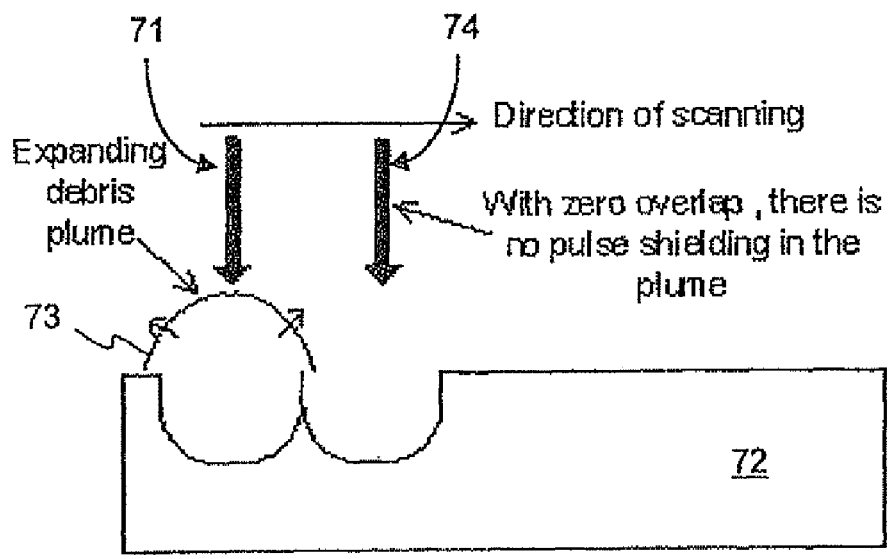
FIG. 7 is a transverse cross-sectional view of laser machining of a substrate according to the invention using substantially non-overlapping pulses.

Referring to FIG. 7, in a method according to the invention, successive pulses 71, 74 are separated sufficiently such that there is substantially no interaction of a current pulse 74 with a plume 73 produced by a previous pulse 71. Since no energy of the pulse is absorbed in the plume of a previous pulse, the overall material removal rate from the substrate 72 is increased.

If pulses of successive scans along a same scan line are located in the same positions as the previous scan, a scalloped die edge is produced so a strategy has been developed in accordance with the invention to offset/dither the start position of each pass of the laser beam to smooth the die edge.

Referring to FIGS. 8 and 9, to smooth the scalloped edge 91 that is created by a first scan using pulses 81 with a zero overlap strategy, each successive pass 82, 83, 84 of the laser beam is offset from a previous pass 81, 82, 83 respectively. In this manner, progressively straighter edges 92, 93, 94 of the scanned feature are produced with each pass.

Thus the invention provides a method for laser scribing, dicing or machining of semiconductor substrates with improved edge quality, throughput and debris control using multiple pass machining with non-overlapping spatial distribution of pulses in each individual pass, but with pulses in succeeding passes offset from pulses in previous passes. This laser machining with zero overlap substantially prevents pulse-plume interaction, and hence substantially eliminates any loss of energy of a succeeding pulse to a plume produced by a previous pulse.

Thus in the laser machining process according to the invention a pulsed laser is used to scan spatially in a direction to be machined. Multiple scans of the laser are used to form a scribe or through feature. The scanning velocity $V_g$ and repetition rate R of the pulses is such that pulses do not overlap. A repetition range of 200 kHz to 300 kHz has been found to be suitable. Individual scans of the laser are positioned spatially to overlap with preceding scans by synchronising and use of a time delay in pulse emission from the laser.

This process results in the following advantages:

1. Improved side wall quality
2. Increased die strength
3. Reduced bound debris
4. Increased throughput Example The laser parameters used are described in Table 1 below. The laser ran at 170 kHz, which gave a pulse energy at the wafer of ~60 μJ. The scan speed was varied from 500 mm/s to 3500 mm/s to give overlaps in the range 80% to −50%. The overlap was determined from the ablated spot diameter (~14 μm) rather than the theoretical spot diameter (~8 μm).

A 75 μm wafer was diced, and the number of passes to cut through at each overlap was determined, as shown in Table 2. In each case the machining speed was measured. The graph 101 in FIG. 10 shows that the machining speed increased nearly linearly with decreasing percentage overlap or increasing spacing of successive pulses. It is believed that this is mostly due to the reduction in pulse-plume interaction, as described above. It may also be because there is less material being removed overall as the overlap decreases and the edges become 'scalloped'. If the process is adjusted to offset successive passes to produced less scalloped edges, then the increase in machining speed is found to be slightly less pronounced, as shown by line 102 in FIG. 10.

TABLE 1

Laser parameters

| Parameter | Setting | |
|---|---|---|
| Current | 92% | |
| ThermaTrack | 1850 | |
| Rep rate | 170 | kHz |
| Front panel power | 13.6 | W (@170 kHz) |
| Wafer level power | 10.3 | W (@170 kHz) |
| Pulse energy | 60 | μJ |
| Pulse width | 40 | ns |
| Beam diameter | 7 | mm |
| Spot size (calculated) | 8.4 | um |
| Average power density | 18 | MW/cm$^2$ |
| Energy density | 108 | J/cm$^2$ |
| Peak power density | 2.7 | GW/cm$^2$ |

TABLE 2

Dicing experiment

| Rep Rate (kHz) | Scan Speed | Overlap % | Passes to cut through 75 μm wafer | Machining speed* (mm/s) | Ablated spot diameter (μm) |
|---|---|---|---|---|---|
| 170 | 500 mm/s | 78.99% | 8 | 62.50 | 14 |
| 170 | 1000 mm/s | 57.98% | 12 | 83.33 | 14 |
| 170 | 1250 mm/s | 47.48% | 13 | 96.15 | 14 |
| 170 | 1500 mm/s | 36.97% | 15 | 100.00 | 14 |
| 170 | 1750 mm/s | 26.47% | 15 | 116.67 | 14 |
| 170 | 2000 mm/s | 15.97% | 13 | 153.85 | 14 |
| 170 | 2380 mm/s | 0.00% | 13 | 183.08 | 14 |
| 170 | 3000 mm/s | −26.05% | 13 | 230.77 | 14 |
| 170 | 3500 mm/s | −47.06% | 14 | 250.00 | 14 |

*Theoretical machining speed

It has therefore been demonstrated that dicing with zero overlap according to the invention results in more efficient material removal from the wafer. The depth per pulse increases with decreasing overlap as the attenuation of the pulses in the debris plume decreases. To ensure a smooth die edge, a strategy is employed whereby pulses in succeeding passes are offset from the previous pass.

Although the invention has been described in terms of machining a channel in a substrate, particularly for the dicing of a semiconductor substrate, it will be understood that the invention has applicability in the laser machining of other features where overlapping pulses are presently used, such as, for example, in machining an ingot from a substrate.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

We claim:

1. A method of laser machining a feature in a substrate comprising:

a. machining the substrate with a pulsed laser along a linear scan line with a first scan such that a centre to centre spatial distance at the substrate between successive pulses in the laser pulse train is equal to at least a sum of radii of the successive pulses and the successive pulses at the substrate do not overlap but are either contiguous or spaced apart; and
b. machining with succeeding scans of the laser along the same scan line which are offset along the scan line by less than a diameter of the pulses with respect to the starting point of a previous scan so that pulses of multiple successive laser scans overlap pulses of preceding scans to provide machining to a required depth while smoothing edges of the feature.

2. A method as claimed in claim 1, wherein successive pulses are sufficiently separated on the substrate that a plume produced by a laser pulse does not substantially absorb energy from a succeeding pulse.

3. A method as claimed in claim 1, comprising machining with a pulse repetition rate of 200 kHz to 300 kHz.

4. A method as claimed in claim 1, comprising complete dicing or slot cutting through the substrate.

5. A method as claimed in claim 1, wherein the machining comprises a laser dicing process for semiconductor dicing.

6. A method as claimed in claim 1, wherein the machining comprises slot drilling.

* * * * *